United States Patent [19]

Lapornik et al.

[11] 4,102,575
[45] Jul. 25, 1978

[54] BACK VERTEX ANNULAR APERTURE

[75] Inventors: Edward F. Lapornik, Washington, D.C.; Douglas D. Rife, Herndon, Va.

[73] Assignee: Acuity Systems, Incorporated, S. Reston, Va.

[21] Appl. No.: 782,297

[22] Filed: Mar. 28, 1977

[51] Int. Cl.² .............................................. G01B 9/00
[52] U.S. Cl. ..................................... 356/125; 356/127
[58] Field of Search ............... 356/124, 125, 126, 127, 356/128

[56] References Cited

U.S. PATENT DOCUMENTS

| 3,832,066 | 8/1974 | Cornsweet | 356/125 |
| 3,880,525 | 4/1975 | Johnson | 356/127 |
| 4,007,990 | 2/1977 | McDevitt et al. | 356/124 |

Primary Examiner—John K. Corbin
Assistant Examiner—R. A. Rosenberger

Attorney, Agent, or Firm—Cushman, Darby & Cushman

[57] ABSTRACT

Apparatus for measuring the refractive properties of an optical system of the type utilizing a light beam scanned in a circle or predetermined radius about the central axis of the optical system to provide a refracted beam. A generally opaque mask having specially configured annular transparent portions positioned in the path of the refracted beam to eliminate errors caused by deviations in radial height from the scanning radius of the refracted beam as it exits the optical system due to refraction within the interior of the optical system. A position-sensitive photodetector generates a signal indicative of the instantaneous position in a given plane due to refraction of the portion of the light beam passing through the mask. The photodetector output signal is then processed to provide an indication of the refractive properties.

7 Claims, 5 Drawing Figures

BACK VERTEX ANNULAR APERTURE

CROSS REFERENCE TO RELATED DISCLOSURE

Of interest is copending application Ser. No. 782,296, entitled "Apparatus and Method for Measuring the Vertex Power of Lens System", filed on or about even date herewith, by E. F. Lapornik, commonly assigned with the present invention to Acuity Systems, Incorporated, Reston, Virginia.

The present invention is related to apparatus for measuring refractive properties of lens systems and, in particular, for measuring the back vertex power of a sphero-cylindrical lens system. An example of a sphero-cylindrical lens system is a spectacle lens. Such an apparatus is often referred to as a lensmeter.

A sphero-cylindrical lens system is, in effect, a combination of spherical lenses and cylindrical lenses. Sphero-cylindrical lens systems are generally described in terms of the following parameters: spherical power, cylindrical power, cylindrical axis, prism power and prism axis. The spherical power of the lens system is defined as the reciprocal of the spherical focal length in meters and is generally expressed in dioptors. The cylinder power of a lens is the difference of the orthogonal major and minor powers of a cylindrical lens. The cylindrical axis is the angular orientation, generally expressed in degrees, of the major or minor power meridian in the lens system.

For a description of various apparatus and methods for analyzing or measuring refractive properties of sphero-cylindrical lens systems, reference is made to U.S. Pat. Nos. 3,832,066 and 3,870,415 issued to T. Cornsweet on Aug. 27, 1974 and Mar. 11, 1975, respectively, commonly assigned with the present invention, and U.S. Pat. No. 3,877,788 issued Apr. 15, 1976 to R. Sprague et al.

A technically and economically feasible apparatus for providing an objective readout of one or more of the above-named lens system parameters is described in U.S. Pat. No. 4,007,990 issued Feb. 15, 1977 to H. I. McDevitt, Jr. et al. The McDevitt, Jr. et al apparatus is commonly assigned with the present invention. Briefly, in the McDevitt Jr. et al apparatus, an incident light beam of parallel rays scans a circular locus at a known radius from the axis of a lens system under test. The resulting refracted beam passing from the lens system is directed onto a position-sensitive photodetector disposed in a subsequent plane. The electrical output of the photodetector is processed to provide a measurement of the lens system's sphero-cylindrical parameters.

As will be more fully explained, an underlying assumption in the operation of such McDevitt, Jr. et al apparatus is that the scanned light beam passes through both the front and back vertex planes of the lens system at the same known radius from the lens system axis. While such an assumption is practically accurate for very thin lenses, it becomes increasingly inaccurate for thicker lenses. As will be appreciated, the incident beam (parallel to the axis) is refracted away from its initial radial position during its passage through the lens itself. Therefore, the radial position of the refracted beam upon exiting the lens is necessarily different from the known incident radial position by an amount which is a function of the lens front surface power, thickness, lens material index, etc. This difference gives rise to an inherent error in the McDevitt, Jr. et al. apparatus.

Now, however, it has been discovered that such error can be substantially eliminated by placing a mask having an aperture of known radial dimensions in the immediate path of the refracted beam passing from the lens. Since the radial position of the aperture is known and fixed, all but those rays of the refracted beam which happen to pass through a slit of known radial position are masked from the detector. Such knowledge of the fixed radial position of the refracted beam provides the McDevitt, Jr. et al apparatus with substantially error-free output vis-a-vis measurement errors otherwise produced with thicker lenses. The present invention is directed to a preferred embodiment of such a mask.

A description of a preferred embodiment follows with reference to the accompanying drawings wherein like numerals denote like elements and:

Figure 1:
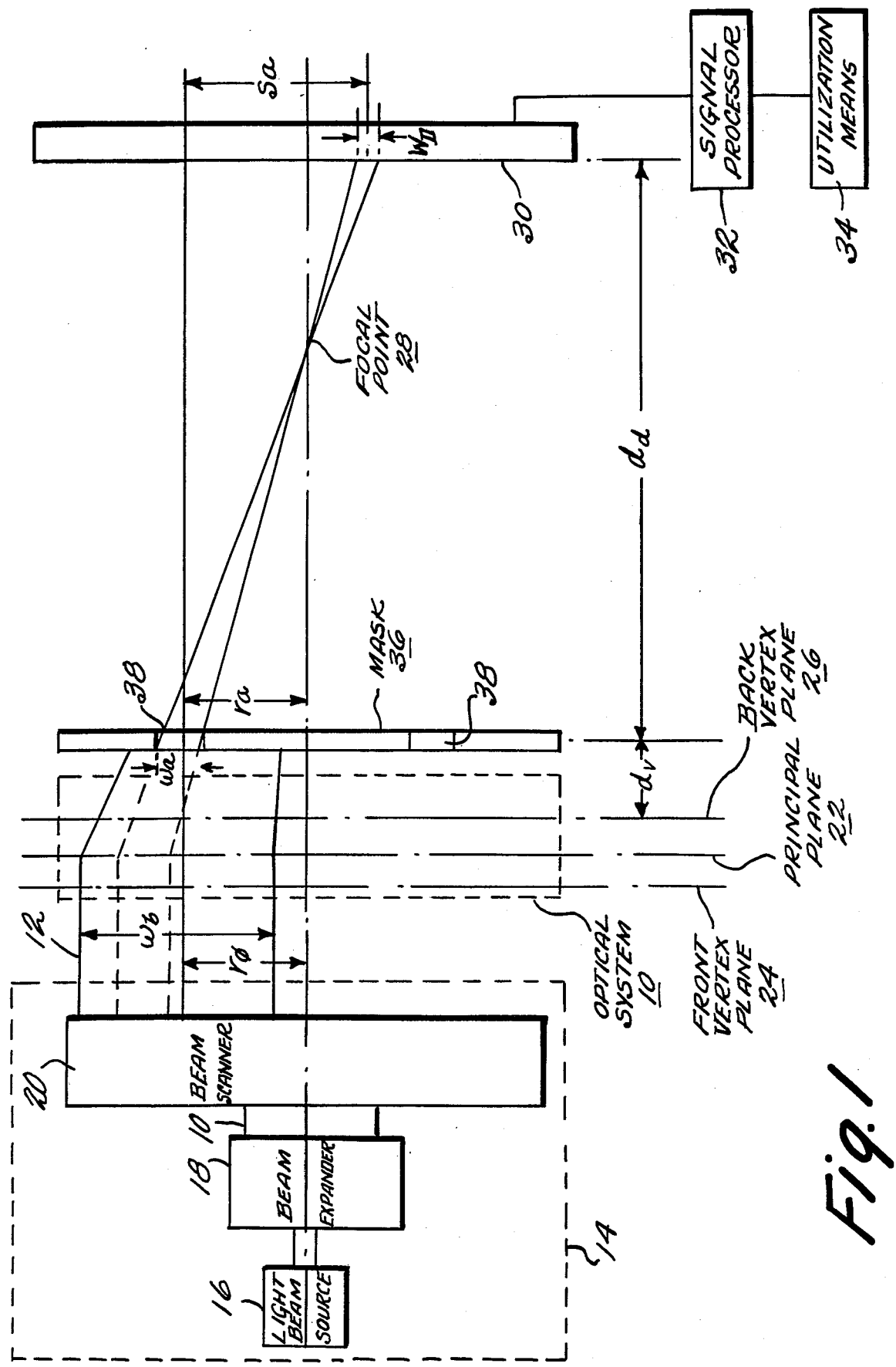
FIG. 1 is a block schematic of an apparatus for measuring the refractive properties of an optical system.

With reference to FIG. 1, a lens system 10 is, as in the McDevitt, Jr. et al. apparatus, placed in the path of a light beam 12 of a predetermined radial width ($W_d$). Beam 12 is provided by means generally indicated as 14. Lens system 10 is represented by a rear principal plane 22, front and back vertex planes 24 and 26, respectively, and has a back focal point 28. Beam 12 rotationally scans at a predetermined centroidal radius $r_o$, about the optical axis of lens system 10, to in effect, describe a circular locus or ring on rear principal plane 22. Beam 12 is refracted by lens system 10 such that, in effect, each ray of the beam tends to pass in a straight line from its intersection with principal plane 22 through focal point 28 to describe a circular or approximately elliptical locus on a subsequent parallel plane located at a predetermined axial position from system 10. A linear position-sensitive photodetector 30, rotating in synchronization with the scanning beam 12, is utilized to measure the parameters of the locus, providing on a meridional basis, a signal indicative of the instantaneous point of intersection of the refracted beam rays with the subsequent plane. Output signals from photodetector 30 are applied to a suitable signal processor 32 which, in effect, separates the various frequency components of the photodetector output signal to develop signals indicative of the various optical parameters of system 10. The parameter signals are applied to suitable utilization means 34, such as a display. For a more detailed description of photodetector 30, signal processor 32 and utilization means 34, reference is made to the aforementioned U.S. Pat. No. 4,007,990 to McDevitt, Jr. et al.

Figure 2:
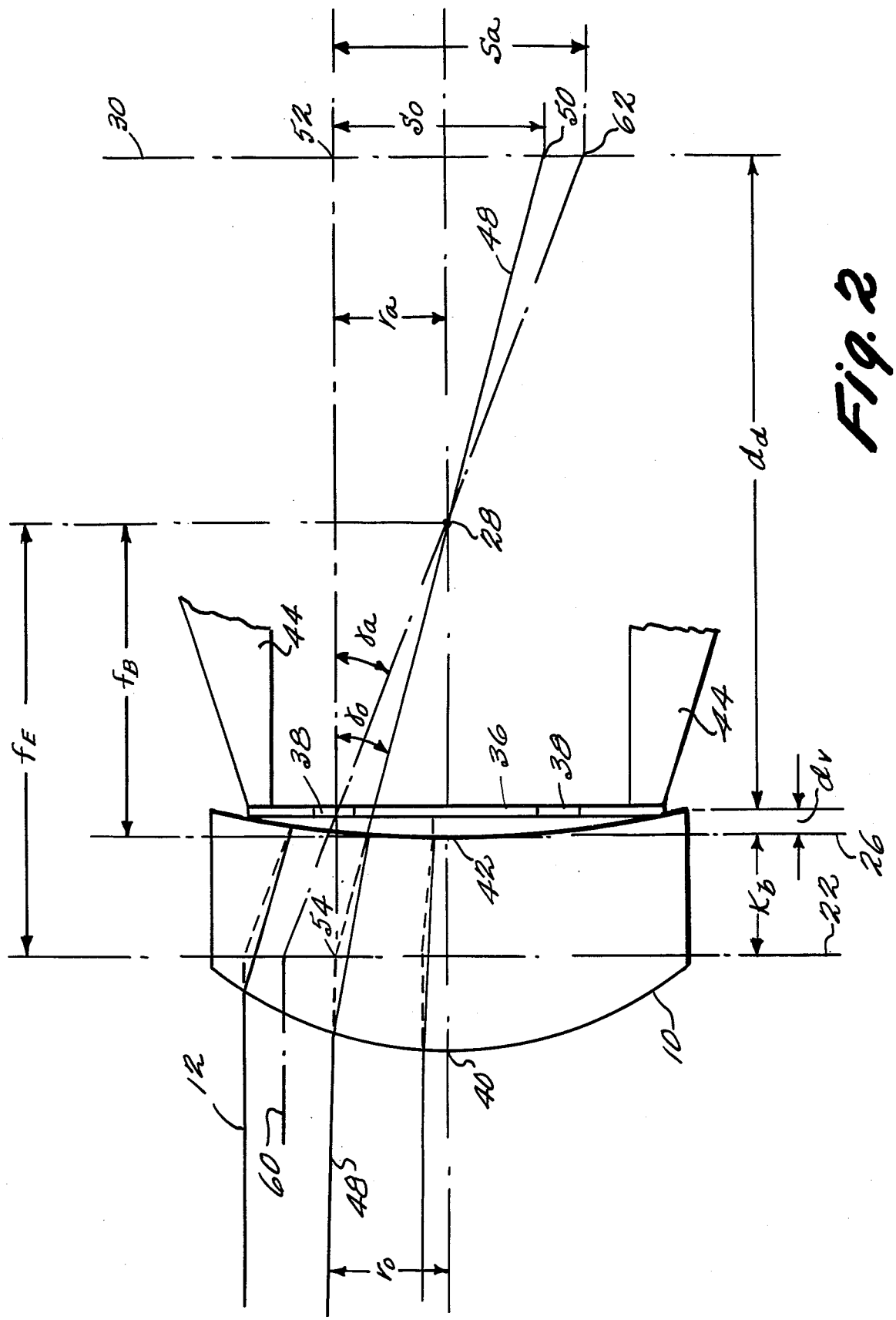
FIG. 2 is a schematic diagram of a meridian section of a portion of such apparatus.

Before proceeding with an explanation of how the back vertex power is measured by the present invention, a more detailed explanation of the derivation of effective focal length ($f_E$) by the aforementioned McDevitt, Jr. et al. apparatus is given to facilitate an understanding of the present invention. With reference now to FIG. 2, lens system 10 is shown in the form of a sphero-cylindrical lens having a rear principal plane 22 and front and back surfaces 40 and 42, surface 42 having a vertex in plane 26. Lens 10 is supported in the path of beam 12 by a lens support cone 44, such that the lens axis is centered on the rotational scanning axis. Support cone 44, in the present invention, preferably includes a mask 36 as will be explained. For the moment, mask 36 is assumed to be absent. With attention directed to a given meridian of lens 10, a centroidal ray 48, parallel to the rotational axis of beam 12 at the scanning radius $r_o$ from the rotational (and lens) axis impinges upon lens 10. Ray 48 is, therefore, refracted such that, in effect, it passes from principal plane 22 in a straight line through focal point 28 to a point 50 on the plane of detector 30. Ray 48 is thus displaced by distance, $s_o$, from the point 52 where it would have intersected the plane of detector 30 had it not been refracted.

Lens 10 refracts ray 48 by an angle $\gamma_0$ having a tangent in accordance with the following equation:

$$\tan \gamma_0 = s_o/(d_d + d_v + k_b) \tag{1}$$

where $d_d$ is the known distance between detector 30 and support cone 44, $d_v$ is the distance between support cone 44 and vertex 42, and $k_b$ is the distance from rear vertex 42 to rear principal plane 22. It should be noted that a similar angle is formed between ray 48 as refracted and the central axis of the system. Thus, the tangent of the refraction angle is also equal to the scanning radius $r_o$ over the effective focal length $f_E$ of the lens in the instantaneous meridian scanned. Equating the two expressions for the tangent of the refraction angle, the effective power of the lens ($F_E$), that is, the reciprocal of the effective focal length ($f_E$), may be expressed in terms of $s_o$. More specifically:

$$F_E = s_o/r_o(d_d + d_v + k_b) \tag{2}$$

Suitable means, such as photodetector 30, provides an indication of the deviation $s_o$, and therefore the effective lens power $F_E$, or back vertex power $F_B$. Thus, the deviation "$s_o$" measured by detector 30, when normalized to ray scan radius $r_o$ and detector to lens rear principal plane distance, is representative of the effective spherical power of the lens in the particular meridian. Where lens 10 is slightly decentered, the average value of the respective powers measured in opposite meridians is indicative of the true lens power in those meridians and the difference between the powers in a given meridian and the opposite meridian represents the lens decentering or prismatic value in that meridian. Thus, where beam 12 rotationally scans lens 10, a position-sensitive photodetector 30, disposed in the subsequent plane and rotated in synchronization with the light beam, produces an electrical output signal representative of the instantaneous deviation of the refracted light beam from the position of a non-refracted beam. As explained in the aforementioned U.S. Pat. No. 4,007,990 to McDevitt, Jr. et al., the output signal of the photodetector comprises separable frequency components representative of the respective parameters: a DC component representative of the average spherical power, a component at the scanning frequency representative of the prism (decentering) parameters and a component at twice the scanning frequency representative of the cylindrical parameters. Measurement of the lens parameters can, of course, also be made on a meridian-by-meridian basis and means other than a photodetector can be utilized to provide an indication of $s_o$.

It should be appreciated, however, that of the terms contributing to the detector to rear principal plane distance, only the detector to support distance $d_d$ is constant for all lenses analyzed by the system. Thus, it is only convenient to normalize for the ray scan radius $r_o$ and detector support distance $d_d$. Equation 2, thus modified, becomes:

$$F_E = s_o/r_o d_d(1 + d_v/d_d + k_b/d_d) = k_n s_o/(1 + \epsilon_1 + \epsilon_2) \tag{3}$$

where
$k_n = 1/r_o d_d$;
$\epsilon_1 = d_v/d_d$; and
$\epsilon_2 = k_b/d_d$

Thus, the measured deviation "$s_o$" is representative of the effective lens power modified by two error terms, $\epsilon_1$ and $\epsilon_2$, respectively referred to as the "lift error" and "thickness-shape error".

It should be further appreciated that ophthalmic lens parameters are generally defined in terms of vertex power, rather than effective power. The back vertex power may be expressed:

$$F_B = s_o/(r_o d_d) [1 + d_v/d_d - k_b/d_d(s_o/r_o - 1)] \tag{4}$$

Deviation $s_o$ is, therefore, also indicative of the back vertex power of lens 10 in the instantaneous meridian, modified by the lift error $\epsilon_1$ and shape-thickness $\epsilon_2$ terms:

$$F_B = k_n s_o/[1 + \epsilon_1 - \epsilon_2(s_o/r_o 1)]$$

Lift error term $\epsilon_1$ is generally insignificant, but shape-thickness error term $\epsilon_2$ is often appreciable. Shape-thickness error term $\epsilon_2$ is proportional to the front curvature thickness and material index of lens 10 and is, in effect, a measure of the difference in radial height of the ray entering the front surface of the lens and the height of the refracted ray leaving the back surface of lens 10. Thus, a very thin lens or a lens with a front flat surface would have shape-thickness error approaching zero. Ophthalmic lenses, however, are often up to 10mm in thickness and typically have a curved front surface. In addition, it is often desirable to measure both the front and back powers of the lens. The error term for ophthalmic lenses, however, can generally be estimated from industry standards by measuring the thickness of the lens and assuming an error value corresponding to measured power and thickness. No estimation can be made for non-ophthalmic lenses or simultaneously for reversed ophthalmic lenses. While such estimates are generally sufficient, it is desirable to eliminate the shape-thickness error and obtain a direct reading of the true vertex power of the lens.

The present invention provides such a direct readout of the vertex power of lens 10 by the insertion of a mask 36 in an intermediate plane parallel to the rear principal plane of lens 10, at a predetermined axial distance from vertex plane 26. Mask 36 operates to admit to detector 30 within a given meridional section only those rays of beam 12 which pass through a locus or aperture 38 in the mask defining a predetermined range at radial distances from the axis. Aperture 38 is of predetermined radial width $W_a$ on a radius $r_a$ such that it is radially encompassed by the locus defined by beam 12 on the plane of mask 36. As will be explained in more detail below, photodetector 30 generates a signal indicative of the meridional radial deviation of the light rays passing through the center of aperture 38 due to refraction by optical system 10. Since the distances between aperture 38 and photodetector 30 and between aperture 38 and the back vertex 26 of the lens 10 are known, as is the radial distance of aperture 38 from the central axis, the back vertex power of lens 10 in the instantaneous meridian can be calculated.

In addition, the shape-thickness error $\epsilon_2$ present in the McDevitt, Jr. et al. apparatus is avoided by insertion of mask 36 in accordance with the present invention. As noted above, the shape-thickness error is attributable to the fact that the radial height of a given ray when intersecting vertex plane 26 is unknown and cannot easily be determined since the distance from the rear principal plane to the vertex is also unknown. Aperture 38 provides a fixed reference, such that the height of a given ray at a known axial distance from the vertex is predetermined to provide for a determination of vertex power.

With reference to FIG. 2 and attention again directed to a given meridian, lens 10 refracts the ray of light (denoted 60), passing through the center of aperture 38 by an angle $\gamma_a$, such that ray 60 intersects the plane of detector 30 at a point 62. Had light beam 12 not been refracted, i.e., if lens 10 had been absent, the ray passing through the center of aperture 38 would have intersected detector 30 at a point 52.

Aperture 38 should remain within the locus defined by beam 12 on mask 36 regardless of the amount of refraction by lens 10. To this end, it is preferable that the radius $r_a$ of aperture 38 be substantially equal to the incident beam 12 centroid radius $r_o$ and that beam 12 be wide enough in the radial direction to insure that the refracted beam covers aperture 38.

Detector 30 is arranged to generate a signal indicative of the distance $s_a$ between point 52 and the actual intersection point 62. Distance $s_a$ is indicative of the vertex power $F_B$ of lens 10. The tangent of refraction angle $\gamma_a$ is equal to distance $s_a$ over the detector to mask distance $d_d$. By the law of similar triangles, such ratio can be equated to the ratio of the aperture radius $r_a$ to the distance from the mask to focal point 28; expressed mathematically:

$$\tan \gamma_a = s_a/d_d = r_a/(f_b - d_v) \qquad (6)$$

where $s_a$ is the measured deviation of the refracted locus in the plane of detector 30, $f_b$ is the back focal length between vertex 42 and focal point 28, and $d_v$ is the vertex to mask distance. Thus, as expressed mathematically in the following equation, the measured deviation $s_a$, when normalized for aperture radius $r_a$ and detector to mask distance, is a direct indication of the vertex power in that meridian:

$$F_B = 1/f_b = (s_a/r_a d_d)/(1 + d_v s_a/r_a d_d) \qquad (7)$$

As noted above, $d_v$ generally approaches zero and can be ignored. Further, the lift term $(d_v s_a/r_a d_d)$ is equivalent to the lift term in manual vertometers generally used in the art.

Equation 7 fully represents the lens system back vertex power when the lens system is centered and not anamorphic; that is, when the lens system's optical properties are identical in all meridians. Such single meridian measurement could be of practical use on an optical bench for determining, for example, the back focal length of negative lenses. In such instance, aperture 38 would be of pinhole form and positioned at the back vertex plane of the lens, centered in light beam 12. The lens may be offset (in parallel) from the centered position by a known amount.

To provide measurement of the refractive properties of an anamorphic lens system such as a sphero-cylindrical lens, a measurement of the refractive properties must be made in a multiplicity of meridians. To accomplish such a measurement, an effective rotational scanning of the lens system is utilized. The instantaneous deviation $s_a$ measured in a sampled meridional section during the course of the effective scan is, when normalized as above, representative of the sphero-cylindrical lens back vertex power in that meridional section. Thus, the average value of, and the difference between, the readings in opposite meridians respectively provide the true back vertex power in those meridians for a decentered lens and the prismatic value of the lens in those meridians. The average of all the meridional readings represents the mean back vertex sphere power of the sphero-cylindrical lens.

The effective scanning can be accomplished in various manners. The lens system can be rotated with respect to a stationary light beam 12 and aperture 38 by means incorporated into support cone 44. Such a method may be desirable on an optical bench. However, a circular scanning of collimated light beam 12 parallel to the rotational axis is preferred. As mentioned above, such scanning provides for ready indication of lens centering (prism) parameters, as well as the average spherical and the cylindrical parameters of the lens system. A pinhole aperture may be rotated in synchronization with beam 12 behind lens system 10 by means incorporated into support cone 44. However, the mechanism for rotating the aperture can be complex and impractical in various applications. A preferred alternative to a rotating pinhole aperture is a stationary back vertex aperture in the form of a circular annulus of constant radius $r_a$ and radial width $W_a$. The annular aperture is disposed on the top of support cone 44 and centered on the rotational scanning axis.

Where an annular aperture is used, beam 12 should be wide enough in the radial direction to radially encompass the illuminated portion of annulus 38. However, beam 12 should also be as narrow as possible in the tangential direction, to provide a ring-sector projection on detector 30 of a relatively short arc length. A tangentially narrow, radially wide scanning beam can be provided by centering a slot on the rotating scanner or by other means well known in the art.

The arc length of the ring sector projection from annulus 38 can be important where detector 30 is of the type which effectively measures the centroid of the illuminating projection. It should be appreciated that the radial and tangential dimensions of beam 12 at detector 30 are magnified from the corresponding dimensions in the plane of annulus 38 by a factor M where:

$$M = W_d/W_a = (s_a/r_a - 1) \approx (d_d F_B - 1) \qquad (8)$$

Where the tangential arc length of the projection on detector 30 is large with respect to its radial width, slight compensation should be made for ring sector projection centroidal effects.

Annulus radius $r_a$ is chosen in accordance with the variety of lenses to be analyzed by the apparatus. For example, an annulus with a radius of 2 millimeters and width of 0.2 millimeters will accommodate optical systems as small as contact lenses. In order to insure that such an annulus remains within the locus of the refracted beam over a wide range of lens powers and decentering, a beam width of 1.6 millimeters or greater is desirable. Standard lasers provide beams with widths between 0.5 and 0.8 millimeters and, therefore, use of a beam expander may be necessitated. Means 14 (FIG. 1) for providing beam 12, therefore, suitably comprises a conventional beam expander 18 interposed between a conventional light source 16 and beam scanner 20 of the type described in the aforementioned U.S. Pat. No. 4,007,990 to McDevitt, Jr. et al.

Figure 3:
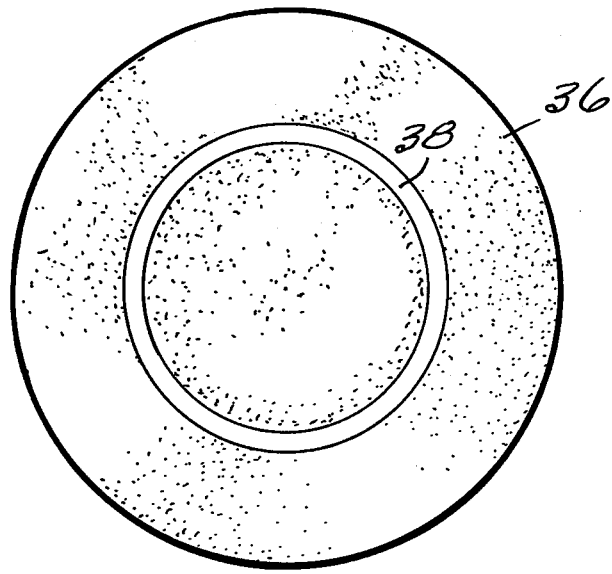
FIGS. 3, 4 and 5 are planar views of various masks in accordance with the present invention.

Various embodiments of mask 36 are illustrated in FIGS. 3-6. Mask 36 can be an integral part of lens support cone 44 or it can be a separate insert. For example, as illustrated in FIG. 3, mask 36 can be formed from a glass sheet having applied an opaque material to all portions thereof except annulus 38. As noted above, annulus 38 suitably has a diameter of 4 millimeters and aperture width of 0.2 millimeters.

Figure 4:
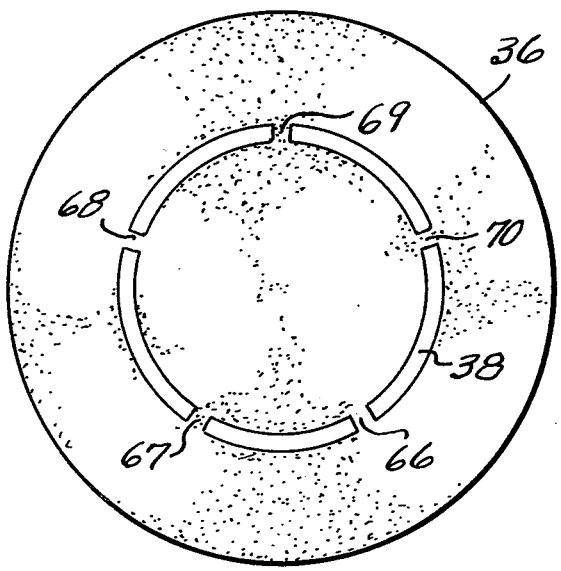
Figure 5:
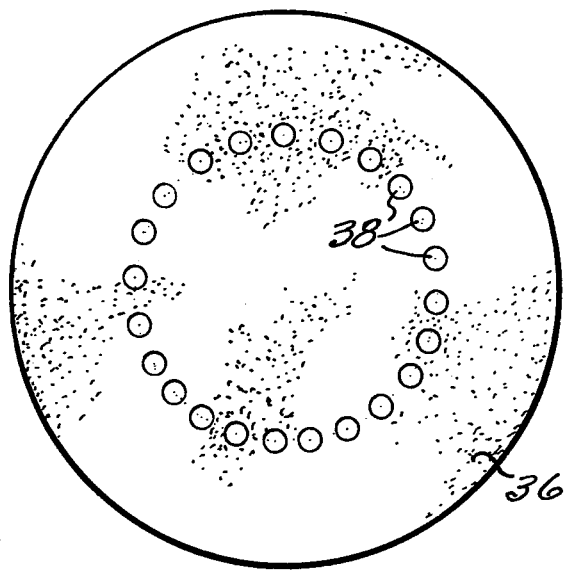

The present inventors have noted, however, that the reflective properties of glass can, in some instances, introduce a small, but significant, error into the system. Accordingly, in accordance with one aspect of the present invention, annulus 38 comprises an air-filled aperture. FIGS. 4 and 5 show such apertured masks. Such masks are preferably formed of metal and made an integral part of support cone 44. It should be appreciated that where the support cone is small with respect to a lens under test, it generally sits flatly against the lens surface such that, as a practical matter, the lens vertex and mask 36 are approximately coplanar.

It should be appreciated that an air-filled annular aperture must include some members, such as ribs or spokes, to maintain the spatial relationship between the inner and outer portions of the mask. Such supportive members, particularly when integral to the cone structure and thus opaque, interfere with the passage of a scanned refracted beam to detector 30, resulting in spurious components in the detector output. It has been discovered, however, the frequency of the spurious components can be predicted. Where the supportive members are symmetrically spaced throughout the annulus, the spurious components occur at frequencies equal to the number of members times the scan rate and at harmonics thereof. Similar analysis can be made regarding unsymmetrically positioned members, in terms of a plurality of frequency components. However, in this case, spurious frequency components can exist at the scan rate and twice the scan rate, at amplitudes dependent on the nature of the asymmetry. Since, as noted above, the frequency components of the detector output at the scan rate and twice the scan rate in a scanning system contain information about the lens being measured, these spurious components can result in significant errors. Thus, in accordance with the present invention, by locating members at predetermined relative positions, preferably symmetrically, and properly choosing the number of members, it can be assured that the spurious components and beat frequencies between the spurious components and the information frequencies do not occur at the frequencies of interest, i.e. the scan rate and twice the scan rate. Thus, a frequency discriminant is established and the spurious signals do not interfere with the information signals. Annuluses having five spokes and twenty-three spokes have been found to generate separable spurious frequency components and are respectively illustrated in FIGS. 4 and 5.

Further, the spurious components can be made to be of low amplitude by utilizing a beam having a tangential width greater than the width of the spoke.

The spurious signals may include a small DC component, effectively offsetting the DC informational signal. However, such offset is a constant machine parameter and can be compensated for in the signal processor.

Although only a preferred embodiment of the present invention is described herein, it is not intended that the invention be restricted thereto but rather be defined by the appended claims.

What is claimed:

1. In an apparatus for measuring refractive properties of a sphero-cylindrical optical system having a vertex and a focal point, said apparatus being of the type including a light source for providing a collimated beam of light of predetermined beamwidth in a predetermined direction, means for positioning said optical system in the path of said beam of light, means for effecting a relative rotation between said light beam and said optical system about an axis parallel to said predetermined direction such that said light beam effectively scans said optical system, to produce a refracted light beam, said refracted light beam tending to illuminate a portion of a subsequent plane parallel to said optical system plane; photodetector means for generating a signal indicative of the instantaneous meridional radial position of said refracted light beam in said subsequent plane, said photodetector signal having predetermined frequency components indicative of respective refractive properties of said optical system; and signal processor means, responsive to said plurality of photodetector output signal frequency components, for generating output signals indicative of said respective refractive properties, the improvement wherein:

said refracted light beam moves about a locus in an intermediate plane, said intermediate plane being parallel to said optical system plane and at a predetermined axial distance from said vertex; and said apparatus further comprises:

means including an annular aperture therein for admitting to said subsequent plane only such portion of said light beam as passes through said aperture, said aperture having a predetermined radius and radial width, and being disposed within said locus at said intermediate plane, said radial width being less than the radial width of said locus, whereby deviations in said refracted beam radial position from said predetermined radius are representative of the spherical power of said lens in the instantaneous meridian scanned;

said aperture including a predetermined number of supportive members connecting said inner and outer edges, said supportive members generating spurious frequency components in said photodetector output signal at frequencies other than said predetermined frequency components; and wherein said signal processor means includes means for discriminating between said predetermined frequency components and said spurious frequency components.

2. The apparatus of claim 1 wherein said supportive members are symmetrically disposed within said annulus.

3. The apparatus of claim 2 wherein said supportive members are of lesser tangential dimension than said light beam tangential beamwidth.

4. The apparatus of claim 2 wherein said predetermined number of supportive members is five.

5. The apparatus of claim 4 wherein said supportive members are of lesser tangential dimension than said light beam tangential beamwidth.

6. The apparatus of claim 1 wherein said supportive members are of lesser tangential dimension than said light beam tangential beamwidth.

7. The apparatus of claim 1 wherein said means for positioning said optical system in the path of said light beam and said means including said aperture comprise an integral structure.

* * * * *